United States Patent
Matsumoto (10) Patent No.: US 6,928,492 B1
(45) Date of Patent: Aug. 9, 2005

(54) COMPUTER I/O DEVICE ACCESS METHOD (75) Inventor: Takashi Matsumoto, Chiba (JP)

(73) Assignee: Japan Science and Technology Agency, Saitama (JP)

(*) Notice: Subject to any disclaimer, the term of this patent is extended or adjusted under 35 U.S.C. 154(b) by 655 days.

(21) Appl. No.: 09/830,588

(22) PCT Filed: Aug. 1, 2000

(86) PCT No.: PCT/JP00/05097
§ 371 (c)(1),
(2), (4) Date: May 9, 2001

(30) Foreign Application Priority Data

Sep. 9, 1999 (JP) .......................... 11/255272

(51) Int. Cl.$^7$ ................................ G06F 3/00
(52) U.S. Cl. .................. 710/5; 710/3; 710/29; 710/33; 710/36; 711/100; 711/200; 712/405
(58) Field of Search ...................... 710/3, 5, 29, 33, 710/36, 107; 711/100, 200; 712/405, 400; 709/233, 200

(56) References Cited

U.S. PATENT DOCUMENTS 5,845,325 A * 12/1998 Loo et al. ............... 711/135
5,887,190 A *  3/1999 Priem et al. ............. 710/3
6,065,071 A *  5/2000 Priem et al. ............. 710/22
6,081,854 A *  6/2000 Priem et al. ............. 710/37
6,321,310 B1 * 11/2001 McCarthy et al. ........ 711/154
6,434,620 B1 *  8/2002 Boucher et al. .......... 709/230

FOREIGN PATENT DOCUMENTS

| JP | 61-253567 | 11/1986 |
| JP | 63-108448 | 5/1988 |
| JP | 9-69060 | 3/1997 |

* cited by examiner

Primary Examiner—Jeffrey Gaffin
Assistant Examiner—Angel L. Casiano
(74) Attorney, Agent, or Firm—Neifeld IP Law, PC (57) ABSTRACT Multiple applications enable communications I/O operation and an I/O interface operations simultaneously at a low cost. The process A requests an OS to allocate an area where a request to an I/O device is put. The OS also allocates an unused context ID for the I/O device to the process A, maps a memory page corresponding to the context ID as an address for accessing the pending register for the process A, and stores a pointer (a physical address) to a request storing area of the process A into an embedded memory in the I/O device. The process A writes contents of requests in its own request storing area, and the OS notifies the I/O device that there is an unprocessed request by use of the address for the pending register. The I/O device reads out the contents of the request storing area by a DMA engine, and realizes the request.

7 Claims, 8 Drawing Sheets

PRIOR ART

Fig. 6

PRIOR ART

Fig. 7

PRIOR ART

Fig. 8

COMPUTER I/O DEVICE ACCESS METHOD

This application is a 371 of PCT/JP00/05097 filed Aug. 1, 2000.

FIELD OF INVENTION

The present invention relates to an access method and a recording medium having an access-processing program therein, particularly to a user-level I/O access method and an access-processing program in a virtualized multi-context environment.

DESCRIPTION OF THE RELATED ART

Figure 6:
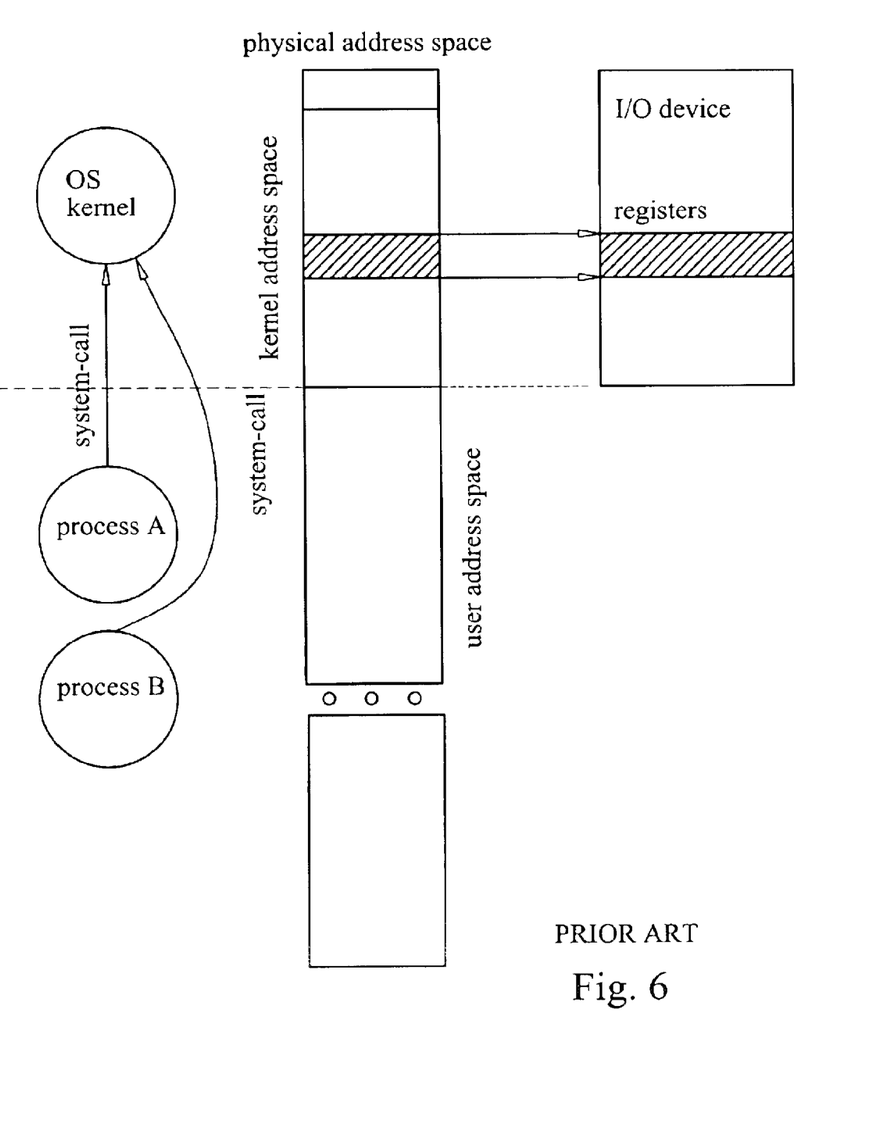
FIG. 6 is an explanatory view of a conventional system 1.

FIG. 6 shows an explanatory view of a conventional system 1. This figure shows an explanatory view of a system where control registers of I/O devices are mapped into the conventional kernel address space.

As shown in the figure, in the conventional system 1, control registers of an I/O device are set to be accessible only by a kernel mode under a general-purpose operating system (OS), thus preventing an illegal operation by a user application. A physical address space is divided into a kernel address space and a user address space. The I/O device can be accessed only by entry addresses in the kernel space, which correspond to the I/O device. And, when a process A as a user application wants to use the I/O device, the process A issues an operation request through a system call of the OS. Then, the OS checks validity of the operation request in the kernel mode, and thereafter, executes a concrete operation to the control registers in the I/O device.

Figure 7:
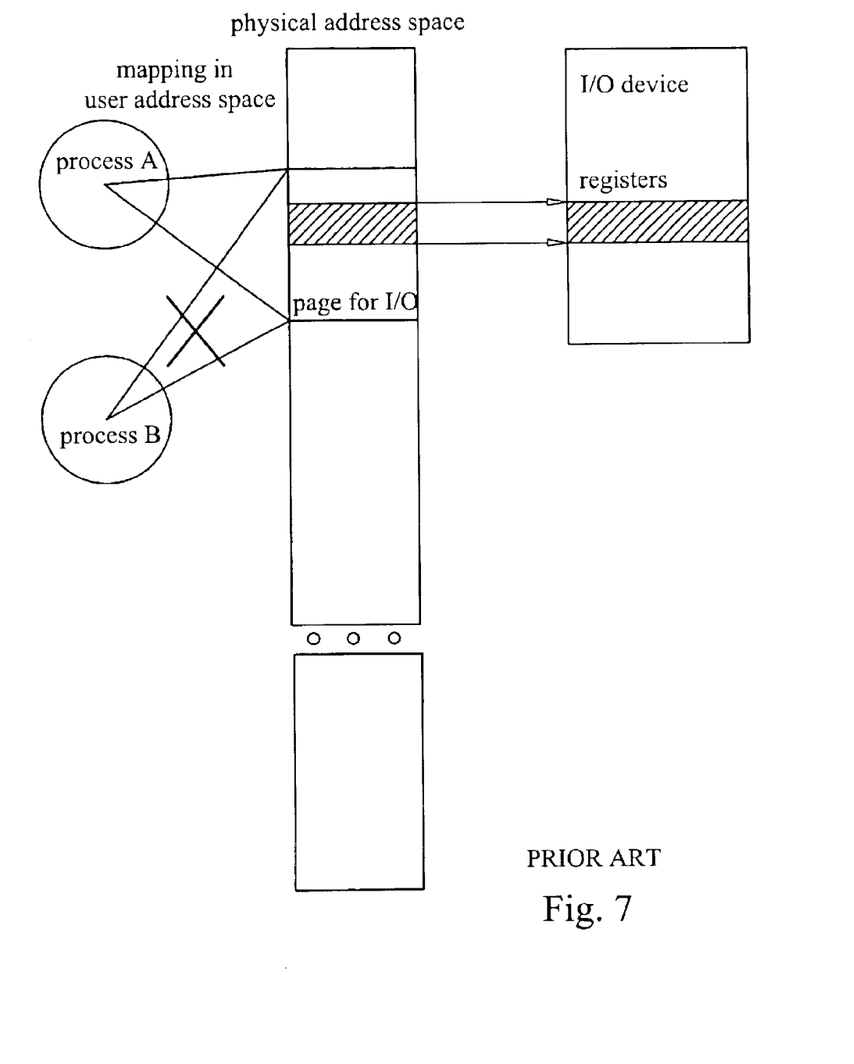
FIG. 7 is an explanatory view of a conventional system 2.

Moreover, recently, a system has been gradually used, in which the control registers of the I/O device are mapped into an address space of a user application, and the user application (user process) directly accesses the control registers and reduces an overhead of the I/O operations. FIG. 7 shows an explanatory view of a conventional system 2. This figure shows a constitution example of the system where control registers are mapped into the user address space. In this conventional system 2, the process A maps a physical page for the I/O device into the user address space of the process A. From the page for I/O device, the control registers of the I/O device can be used.

Figure 8:
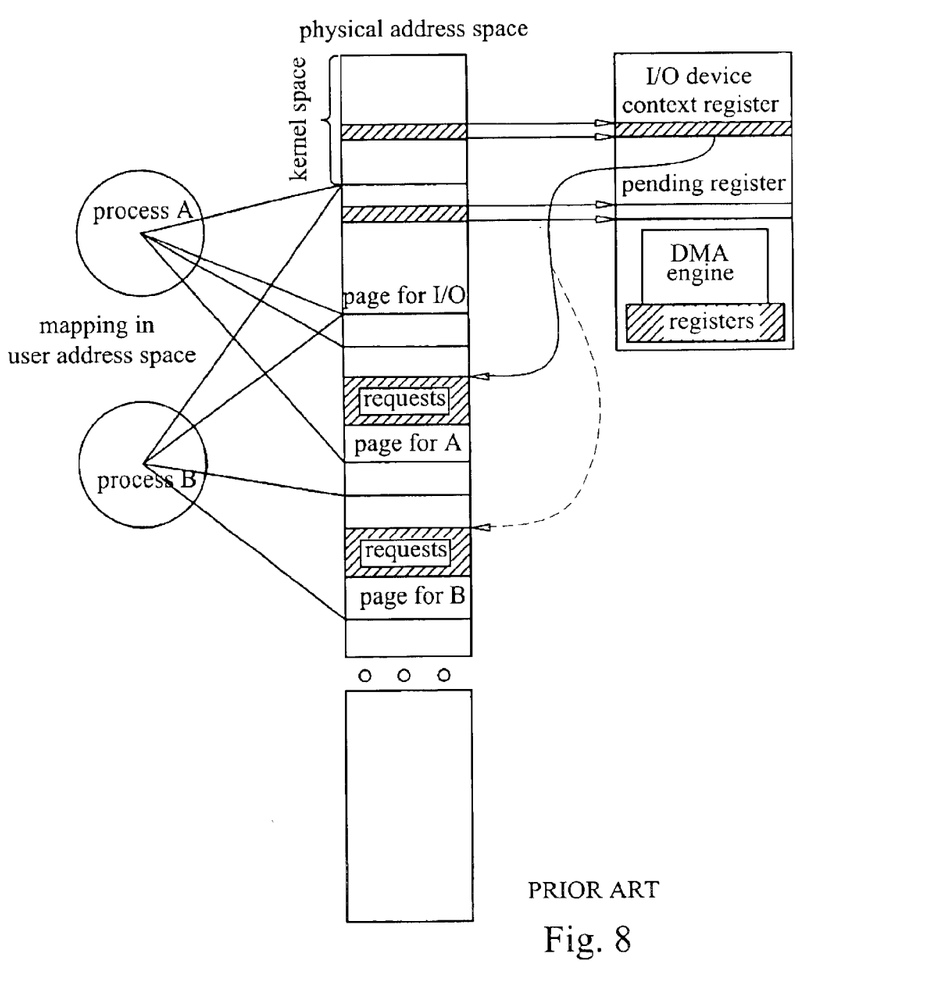
FIG. 8 is an explanatory view of a conventional system 3.

Next, FIG. 8 shows an explanatory view of a conventional system 3. This figure shows an example of a system where the operation request is transferred from the user address space by direct memory access (DMA). In order to eliminate or reduce the overhead of the system call, it is necessary that control information concerning the I/O device is stored into the pages in the user address space. In this point of view, the conventional system 3 is the same as the conventional system 2. Note that, if the control registers of the I/O device are merely mapped into the user address space, there occurs confusion when the control registers are accessed from the plurality of user applications. For solving this, contents of requests for the I/O device can be stored on a memory, in order that the I/O device reads the contents of requests and set them on the control registers. Specifically, the I/O device updates the contents of the control registers by DMA. And if the I/O device operates so as not to start processing a next content of request before the processing for the preceding request is finished (or reached to a breakpoint), the confusion of the operations does not occur. Moreover, since a memory resource is protected under the general-purpose OS, there is no risk of overwriting the contents of requests by other applications.

What becomes important in the conventional system 3 is how to indicate the location of the operation requests on the memory to the I/O device. In the conventional system 3, a context register storing a pointer indicating the location of the requests on the memory is provided in the I/O device. The OS grasps which user's process is running. And, the OS can rewrite the context register according to the running process. In the case where a certain application (for example, process A) is allocated to the processor, a storage location for the operation requests from the concerned application is set in the context register.

In the conventional system 3, a pending register which notifies the registration of the operation requests is mapped into the user address space according to each application. The pending register is used as a flag indicating that a process requires operations by the I/O device. In pages for user processes, the operation requests are stored. The contents of the requests are, for example, an I/O command. If the I/O device is a printer, the I/O command is a print command, a page-feed command or the like. If the I/O device is the other I/O device than the printer, the I/O command is a command as to which device input/output are performed to. When the pending register is accessed, the I/O device fetches (using DMA) the operation requests from the memory location indicated by the context register (the pointer), and executes the requests.

SUMMARY OF THE INVENTION

However, in the conventional system 1, there has been a problem that the overhead of I/O operation is very large since a series of the kernel programs including the system call must be called out for each time when the user application tries to perform an I/O operation.

Therefore, the conventional system 2 has been proposed. However, in this conventional system 2, multiple applications cannot use the I/O device simultaneously. In the example of FIG. 7, when the process A is using the I/O device, the process B cannot use the I/O device. Moreover, since one application changes the contents of the control register of the I/O device solely at its discretion, consistency in the operation of the control register collapses if multiple applications operate the control register on time-sharing basis. Accordingly, in the conventional system 2, an I/O resource must be allocated to one application exclusively for use.

Therefore, the conventional system 3 has been proposed as a system for solving the problem of the overhead of the system call in the conventional system 1 and the problem of the multiple allocation of resources in the conventional system 2. However, in the conventional system 3, the context register in the I/O device becomes a part of a processor context, and for each time when the OS performs a context switch, a location pointer for the operation requests of an application allocated to the processor must be updated. Since the context switch is one of the fundamental operations of the OS, it is difficult to execute modification of extending the processor context to the existing OS. Still less, the processor context cannot be extended by adding a device driver. Moreover, in the case where a computer system connecting with an I/O device is of a multi-processor configuration, the context registers are required in the number equal to that of the processors, and any access to the pending register needs to be discernible as to which processor it is from. In the case where a control circuit of the I/O device is integrated into an LSI, in consideration of multi-processor correspondence, many context registers must be prepared in advance. This results in a waste of cost in a typical single processor or a parallel system with a small number of processors.

As described above, the user-level access methods to I/O devices, which have been heretofore implemented, have the problems to be solved, respectively. Moreover, for example, there has been performed the method of mapping control registers for I/O operations into a user memory space in order to speed up the access to I/O devices at the user level as described above. However, according to the conventional systems, the multiple applications cannot use the devices simultaneously.

In consideration of the foregoing points, the present invention provides an access method enabling multiple applications to execute simultaneously I/O (or I/O interface) operations at a low cost by exploiting a memory management unit, and provides a recording medium for recording an access-processing program.

One of the features of the present invention is that a memory alias (a state where multiple physical addresses are allocated to a single object) is generated intentionally, and that an accessed application is identified by a mechanism detecting by which alias address it has been accessed. Each alias of the same object is aligned to a page-boundary. Since physical memory of the host system is managed by a page unit, allocating a different alias for each application inhibits an illegal action such as an access to another alias address.

According to solutions of the present invention, provided is an access method and a recording medium having an access-processing program comprising the steps of:

requesting, by a user process, an open procedure of an I/O device (or I/O interface) to the operating system;

allocating, by the operating system, a context identifier for indicating a request storing area of the process, and further mapping a memory page corresponding to the context identifier as an accessing address to a pending register indicating that there is an unprocessed request;

writing, by the process, contents of operation requests to the I/O device into the request storing area;

notifying, by the process, the I/O device or the I/O interface that there is an unprocessed request by use of the accessing address for the pending register; and reading, by the I/O device, the operation requests of the process which are stored at the location related to the context identifier in the pending register.

Furthermore, there is provided a recording medium for recording an access-processing program.

In addition, there is provided an address decoding method for selecting a physically same object device in a computer system, the method comprising the steps of:

selecting an object device using only a part of a physical address for decoding;

using another part of the physical address as an identifier for distinguishing multiple physical addresses selecting the object device; and using the identifier in order to identify an application process having accessed the object device.

Furthermore, there is provided a computer system having an address decoder selecting a physically same object device, comprising:

means for selecting an object device by use of only a part of a physical address for decoding the address;

means for identifying an identifier by use of another part of the physical address as the identifier for distinguishing multiple physical addresses selecting the object device; and means for identifying an application process having accessed the object device by use of the identifier.

DETAILED DESCRIPTION OF THE EMBODIMENTS

The present invention provides a novel access method to an I/O device at a user level, which solves the foregoing problems.

In the conventional system 3, if the I/O device can identify which application has executed an access to the pending register indicating that the operation requests not subjected to the I/O processing are present on the memory, a low-cost method of obtaining the memory location for the operation requests can be constituted. In an extreme instance, if sufficient pairs of the context registers and the pending registers exist, and if each application space maps one pending register, then an address for reading out the requests can be decided by use of the contents of the context registers corresponding to the accessed pending registers. In this case, the context registers need not to be provided in the I/O device, and areas on the embedded memory in the I/O device can be sufficiently substituted therefor. Positions of the context registers on the memory can be computed from the positions of the accessed pending registers. If the context register can be provided as an area on the embedded memory inside the I/O device, and if the number of pending registers can be restricted into one or a small number, a user-level access method to an I/O device with very low cost and very little overhead or non-overhead can be achieved.

In the present invention, only one substance of the pending register is prepared. However, multiple address aliases of the pending register are prepared, and a mechanism is prepared for determining from which alias the access is made to the pending register, thus the application (processor context) that has been accessing the pending register is identified. Hereinbelow, description will be made for an embodiment of the present invention by showing a concrete example.

Figure 1:
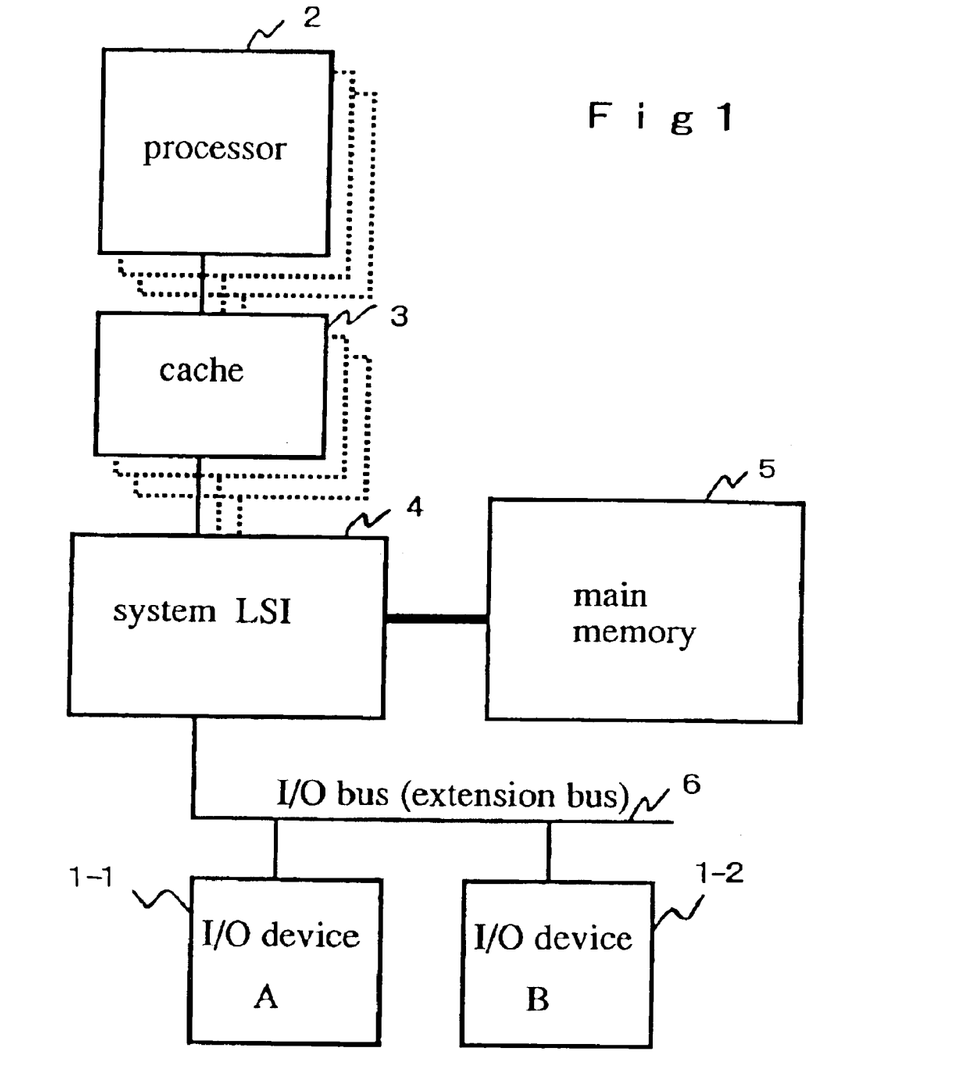
FIG. 1 is a constitutional view of a system relating to the present invention.

FIG. 1 shows an example of a constitutional view of the system relating to the present invention.

FIG. 1 shows a system for realizing an access method to the I/O device with a low overhead at the user level by utilizing, for example, a workstation or personal computer with a standard configuration.

This system comprises: I/O devices (A) 1-1 and (B) 1-2; a processor 2; a cache 3; a system LSI 4; a main memory 5; and an I/O bus 6. The I/O devices (A) 1-1 and (B) 1-2 comprise the pending registers indicating that unprocessed requests are registered therein. These pending registers are mapped into a memory space (or subjected to memory mapping), and are accessed from the processor (to be described later in detail). The processor 2 executes various processing according to the OS in cooperation with the cache 3. The cache 3 is a high-speed memory for copying a program and data for the purpose of speeding up the processing. The system LSI 4 controls transmission/receipt of the data interactively among the I/O devices (A) 1-1 and (B) 1-2, the processor 2 and the main memory 5. The main memory 5 stores the program, the data and the like, such as the operating system (OS), various processes as applications and the physical address space. And the I/O bus 6 can be configured as an extension bus.

Figure 2:
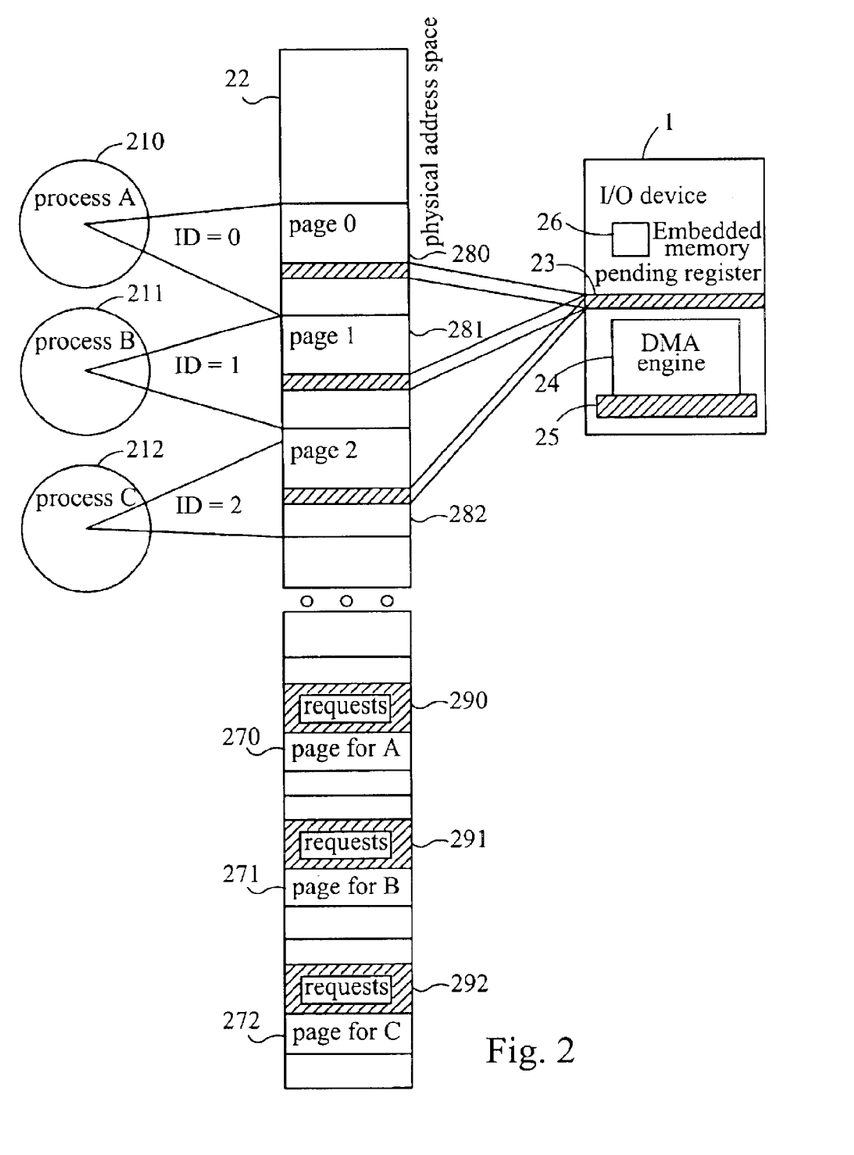
FIG. 2 is an explanatory view of an access method according to the present invention.

Next, FIG. 2 shows an explanatory view of the access method according to the present invention. This figure shows an address map of pending registers.

In this example, processes A to C 210 to 212, a physical address space 22 and an I/O device 1 are shown. The I/O device 1 comprises: a pending register 23; a DMA engine 24; a request executing register 25; and an embedded memory 26. Moreover, pages for process A to C 270 to 272 and memory pages for process A to C 280 to 282 are prepared in the physical address space, and the requests from the respective processes are stored in request storing areas 290 to 292.

Figure 3:
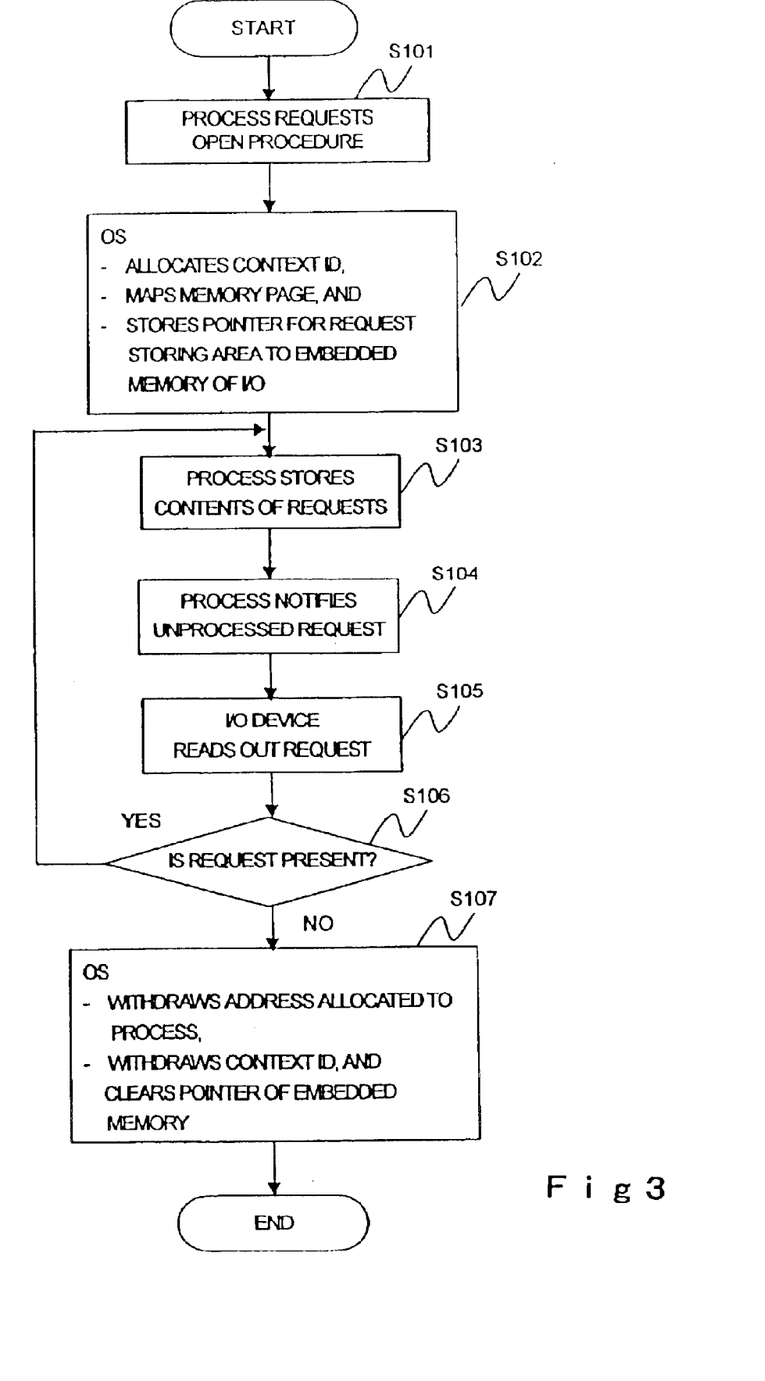
FIG. 3 is a flowchart regarding an OS and a process in the access method according to the present invention.
Figure 4:
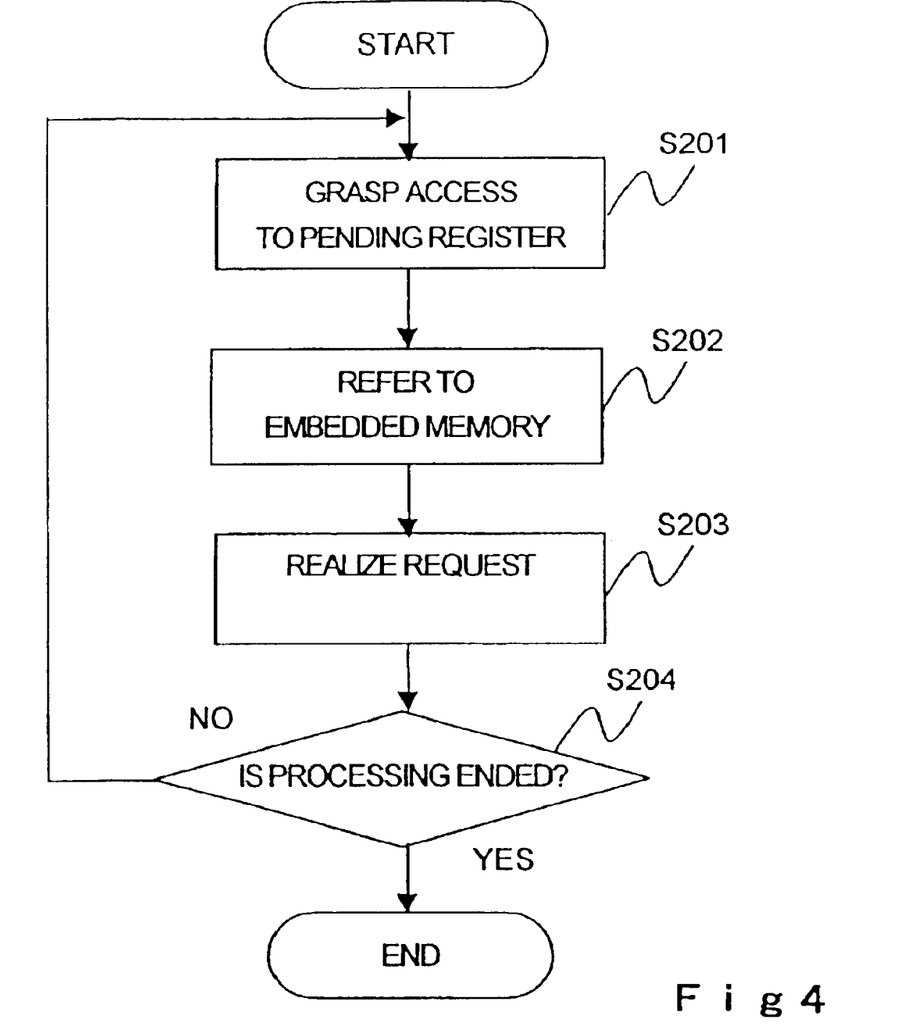
FIG. 4 is a flowchart regarding an I/O device in the access method according to the present invention.

FIG. 3 shows a flowchart regarding the OS and the process in the access method according to the present invention. And, FIG. 4 shows a flowchart regarding the I/O device in the access Method according to the present invention. Hereinbelow, description will be made for the access method of the present invention with reference to FIGS. 2 to 4.

First, the processing regarding the OS and the process will be described based on FIG. 2 and the flowchart of FIG. 3.

Since the OS manages the process, the OS has grasped the presence of the processes A to C from the beginning when they were created. What is understood from an open procedure is that the process that requested the open procedure to the OS is going to use the I/O device 1 later. First, the process for using the I/O device, from the viewpoint of process, will be executed as follows.

In Step S101, a process (for example, process A 210) requests the open procedure of the I/O device 1 to the OS. At this time, the process instructs the OS on an area where its own requests to the I/O device 1 will be stored. Next, in Step S102, first during the open procedure, the OS allocates an unused context ID for the I/O device 1 (for example, ID=0) to the process A 210, and maps the physical memory page 280 (page 0) corresponding to this ID as an logical address for access to the pending register 23 by the process A 210. The mapped logical address is notified from the OS to the process A 210 as a result of the open procedure (system call). Moreover, in Step S102, secondly during the open procedure, the OS stores a pointer (physical address) to the request storing area 290 of the process A 210 in the embedded memory 26 in the I/O device 1. The stored address for requests is set in a location easily computable with the context ID allocated to the process A 210. That is, a table for retrieving the pointer to the request storing area out of the context ID is formed on the embedded memory.

In Step S103, the process A 210 describes the contents of operation requests to the I/O device 1 into its own request storing area 290. In Step S104, after description of the contents of requests, the process A 210 notifies the I/O device of presence of the unprocessed requests by use of the logical address for the pending register 23, which is allocated by the open procedure. To be concrete, the process A 210 accesses the address of the pending register 23. In Step S105, the I/O device reads the request out of the request storing area 290. In Step S106, if the process A 210 has another request to the I/O device 1, Step 103 and Step 104 are iterated. In Step S107, when the process A requests a close procedure of the I/O device to the OS, or when the process A 210 is ended, the OS withdraws the physical page for the pending register 23 allocated to the process A 210, withdraws the context ID for the I/O device (to be stored as a blank ID), and clears the entry of the pointer to the storing area 290 of the request from process A 210 on the embedded memory 26.

Next, based on FIG. 2 and the flowchart of FIG. 4, the processing regarding the I/O device will be described. From the viewpoint of the I/O device, the processing will be executed as follows.

In Step S201, it is identified from output of a first in first-out (FIFO) memory output that the pending register 23 has been accessed. In Step S202, since the FIFO output includes the context ID, the physical address of the request storing area 290 of the process A 210 that has accessed the pending register is identified by referring to the table on the embedded memory 26. In Step S203, the DMA engine 24 reads out the contents of the request storing area 290, controls the internal register 25 according to the contents, and executes the request. In Step S204, the I/O device iterates these operations until, for example, the power source is cut off.

The process B and the process C also can use the I/O device 1 in exactly the same manner. Here, it is important from a viewpoint of reduction of the overhead that the OS is never interposed in Steps S103 and S104. Even if the processes allocated to the host processor are switched on time-sharing basis, the requesting process is uniquely understood by use of the physical address to the pending register that includes the context ID. Accordingly, the OS needs not to perform any additional operation in the event of switching the processes. Note that, in the conventional system 3, the context registers must have been switched.

Figure 5:
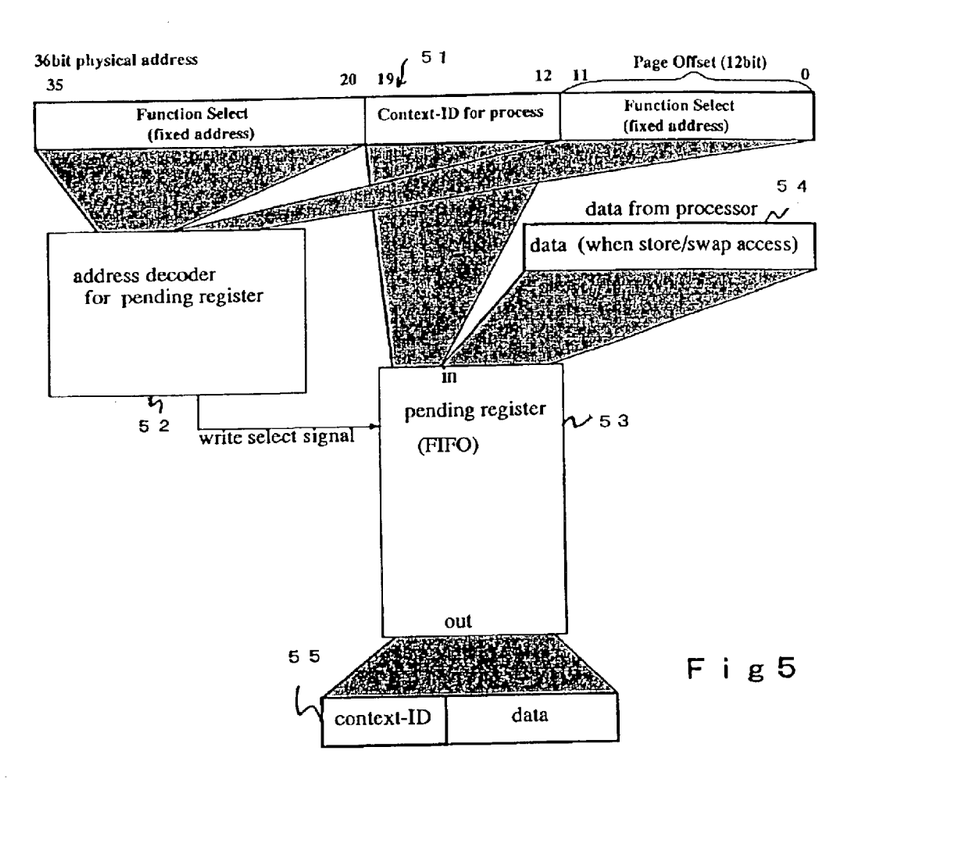
FIG. 5 is an explanatory view of a mechanism storing data in a pending register.

Next, FIG. 5 shows an explanatory view of a mechanism storing data in the pending register.

A memory structure on the top of FIG. 5 shows a physical address 51 which specifies the I/O device.

Here, as an example, the physical address 51 is constituted of 36 bits and includes: a field for function select as page offset in 0 to $11^{th}$ bits; a field for the context ID for process in $12^{th}$ to $19^{th}$ bits; and a field for function select in $20^{th}$ to $35^{th}$ bits. Moreover, as in the figure, a field for indicating the context ID (e.g., 8 bits in the figure) is prepared in a portion higher in order than the page offset (e.g., 12 bits or 13 bits in a typical processor). It should be noted that the field for the context ID is not used for decoding the address, and that what is usable for decoding the address of the pending register is portions of the field higher in order than the context ID and the page offset. The area for the function select indicates a location of the pending register.

The function select in the high-order address must be decoded (decided uniquely), while the low-order address (offset portion) does not have to be decoded. In the case where the offset portion is not to be decoded, the pending register is specified only by the high-order address, regardless of what kind of pattern the offset portion is. Note that, since the memory address can be allocated to the process only by page unit, other processes are not affected if the decoding of the offset portion is omitted. On the contrary, when the decoding is not omitted, another register or a memory can be allocated on the same page of the pending register. In this case, an address of a different bit pattern in the page offset portion is used.

Moreover, the context ID field indicates the process using the I/O device (for example, any one of the processes A to C). When the context ID field has 8 bits, even if the 256 processes issue requests for using the I/O device (to open) simultaneously, the context ID field can cope with all requests.

In the case where a fixed address indicating the location of the pending register is stored in the function select field of the physical address 51, an address decoder 52 for the pending register selects the pending register, and stores the context ID of the physical address 51 in the pending register 53. Moreover, according to needs, data 54 can be stored in the pending register 53 in correspondence with the context ID. The data 54 can be given from, for example, the processor, the main memory, an interface and the like (for example, in the event of store/swap access). An output 55 of the pending register 53 includes the context ID, and occasionally, also includes the data corresponding thereto.

Each application has a specified context ID allocated thereto, and maps only the page according to the context ID. Specifically, where the application is different, the same pending register is accessed by a physical address having a different context ID field. Where the I/O device has a capability of holding and interpreting the context ID field each time when it is accessed, the I/O device can clarify as to which application has accessed the pending register. The access to the pending register is an access by the user application, and there is no limitation to the timing of execution. The I/O processing cannot be performed without synchronizing the operation of the I/O device and the receipt of a new request by the pending register. Therefore, the access to the pending register 53 must be buffered to the FIFO configuring the same. At this time, the contents of access (information telling that they are "writing" and "written data" when the contents are writing) are not only buffered, but the context ID is also buffered simultaneously. The address of the area, where the operation requests are stored by the application, and the address are obtained from the context ID by an appropriate calculation, and the I/O device reads out the requests using DMA engine 24, and performs the input/output processing.

A return-value or interruption can be used to deal with overfilling of the FIFO buffer.

In the case where the return-value is used to deal with the overfilling, if the "written data" is not required, the pending register is accessed by a load (memory reading-out) instruction. And in the case where the FIFO buffer is overfilled, an error code (for example, −1) is returned as the return-value. The user application checks the return-value and iterates the access until it succeeds. If the "written data" is required, the user application delivers the data to the I/O device 1 while receiving the return-value by a swap (atomic read-write operation) instruction.

It takes a long time and a much cost for the processor to execute the load instruction or the swap instruction through the extension bus for the I/O device in comparison with the store instruction. Therefore, in the case where the interruption is used to deal with the overfilling of the FIFO buffer, the overfilling of the FIFO buffer is detected by the interruption in order to enable the access to the pending register by the store instruction. If the capacity of the FIFO buffer is sufficient and the capability of the I/O device 1 is not saturated, then the overfilling of the FIFO buffer does not occur. If the overfilling of the FIFO buffer occurs, then, thinking that it costs inevitably a certain amount of the processing cost, the interruption is generated to temporarily store the application which have failed to access and the contents of access in the pending register by the OS. Thereafter, when the application and the contents of access are registerable in the I/O device, they are processed.

Note that, the access method according to the present invention can be applied to an appropriate access to an interface, not being limited to the I/O device. Moreover, the access method according to the present invention can be provided as an access-processing program by a recording medium such as CD-ROM or a transmission medium such as the Internet.

INDUSTRIAL APPLICABILITY

As described above, according to the present invention, there can be provided the access method enabling multiple applications to execute simultaneously the I/O operations (or the interface operations) at a low cost by exploiting the memory management unit, and the recording medium for recording the access-processing program.

What is claimed is:

1. An access method comprising the steps of:
   requesting, by a process, an open procedure of an I/O device or an I/O interface to an operating system;
   allocating, by the operating system, a context identifier for indicating a request storing area of the process;
   mapping a memory page corresponding to the context identifier as an accessing address to a pending register, said pending register indicating that there is an unprocessed request;
   writing, by the process, contents of operation requests to the I/O device or the I/O interface into the request storing area;
   notifying, by the process, the I/O device or the I/O interface that there is an unprocessed request by use of the accessing address for the pending register; and
   reading, by the I/O device or the I/O interface, the operation requests of the process which are stored at the location related to the context identifier stored in the pending register.

2. The access method according to claim 1, wherein the operating system stores a physical address of the request storing area corresponding to each process into an embedded memory in the I/O device or the I/O interface.

3. The access method according to claim 1, comprising the steps, performed by the I/O device or the I/O interface, of:
   identifying that the pending register has been accessed;
   obtaining a physical address of the request storing area of the process having accessed the pending register by referring to an embedded memory storing the physical address of the request storing area of each process based on the context identifier; and
   reading out the contents of the request storing area, and of realizing the operation requests.

4. The access method according to claim 1, wherein a physical address specifying the I/O device or the I/O interface includes a function select field indicating a position of the pending register and a context identifier field indicating the process, and an address decoder stores the context identifier of the physical address in the pending register in the case where a fixed address indicating the position of the pending register is stored in the function select field of the physical address.

5. The access method according to claim 1, wherein other data corresponding to the context identifier is stored in the pending register according to needs.

6. The access method according to claim 1, wherein, in any one of the cases where the process requests a close procedure of the I/O device or the I/O interface to the operating system and where the process is ended, the operating system withdraws the physical page for the pending register allocated to the process, withdraws the context identifier for the I/O device or the I/O interface, and/or clears an entry of a physical address to the request area of the process on an embedded memory.

7. A recording medium having an access-processing program, wherein the access-processing program includes the steps of:

requesting, by a process, an open procedure of an I/O device or an I/O interface to an operating system;

allocating, by the operating system, a context identifier for indicating a request storing area of the process;

mapping a memory page corresponding to the context identifier as an accessing address to a pending register, said pending register indicating that there is an unprocessed request;

writing, by the process, contents of operation requests to the I/O device or the I/O interface into the request storing area;

notifying, by the process, the I/O device or the I/O interface that there is an unprocessed request by use of the accessing address for the pending register; and reading, by the I/O device or the I/O interface, the operation requests of the process which are stored at the location related to the context identifier stored in the pending register.

* * * * *